Aug. 4, 1959 R. A. MATHIAS ET AL 2,898,043
ELECTRIC CIRCUITS FOR PERFORMING ANALYTIC OPERATIONS
Filed Jan. 18, 1954 3 Sheets-Sheet 1

INVENTORS.
LEO A. FINIZI
ROBERT A. MATHIAS
BY
*D.E. Snyder*
*Roderick B. Jones*
ATTORNEYS

INVENTORS.
LEO A. FINIZI
ROBERT A. MATHIAS

INVENTORS.
LEO A. FINIZI
ROBERT A. MATHIAS
BY
ATTORNEYS

United States Patent Office 2,898,043
Patented Aug. 4, 1959

2,898,043

ELECTRIC CIRCUITS FOR PERFORMING ANALYTIC OPERATIONS

Robert A. Mathias, Pittsburgh, and Leo A. Finzi, Irwin, Pa., assignors, by mesne assignments, to the United States of America as represented by the Secretary of the Navy Application January 18, 1954, Serial No. 404,821

6 Claims. (Cl. 235—178)

The present invention relates to electric circuits containing linear and non-linear static elements and more particularly to electric circuits capable of performing multiplication, division and other analytical operations.

An object of the invention is to provide output voltages or currents proportional to the product or quotient of any number of input signals.

Another object is to perform indefinite integrations on assigned signals of the type where voltage is a function of time.

A further object of the invention is to provide a simple circuit comprising a number of magnetic cores, a few half-wave rectifiers and a few resistors for performing the operation:

$$X = \frac{a_1 \cdot a_2 \cdot a_3 \cdots a_n}{b_1 \cdot b_2 \cdot b_3 \cdots b_{(n-1)}}$$

wherein $a_1, a_2, a_3 \ldots a_n$ represent quantities directly proportional to any number of half-wave rectified voltages of a signal source ($V_1, V_2, V_3 \ldots V_n$); $b_1, b_2, b_3 \ldots b_{(n-1)}$ represent quantities directly proportional to any number of sinusoidal "gate" voltages from a power supply ($V_{gc1}, V_{gc2}, V_{gc3} \ldots V_{gc(n-1)}$; the number of magnetic cores is equal to the number of multiplying factors $a_1, a_2, \ldots$ etc.; and, the number of rectifiers and resistors are proportional to the number of stages of multiplication.

These and other objects of the invention and the various features and details of construction and operation thereof are hereinafter more fully set forth and described with reference to the accompanying drawings, in which like numbers refer to like parts.

Figure 1:
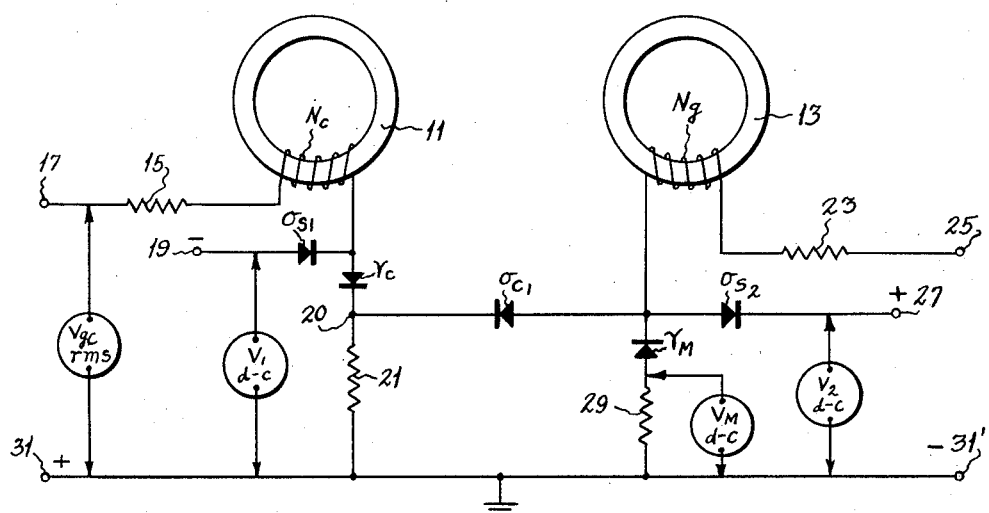
Fig. 1 is a diagram showing one embodiment of the invention.

As can be seen in Fig. 1, the invention includes in combination a number of linear and non-linear static circuit elements specially connected to each other. These elements are commonly found and employed in magnetic-amplifier circuits. Basically, the circuit consists of two separate magnetic cores 11 and 13 of the "square loop" type made from grain-oriented nickel alloys. Suitably wound around cores 11 and 13 are windings designated Nc and Ng. One end of winding Nc is attached to a resistor 15, the other end of said resistor being connected to an input terminal 17. The other end of winding Nc is connected to the junction point of half-wave rectifiers $\gamma_c$ and $\sigma_{s1}$. The other side of rectifier $\sigma_{s1}$ terminates at terminal 19, whereas the other side of rectifier $\gamma_c$ is connected at terminal 20 to a resistor 21 which in turn is connected to ground. The portion of the circuit comprising magnetic core 11, winding Nc and half-wave rectifiers $\gamma_c$ and $\sigma_{s1}$ is designated the "converter stage."

Connected to one end of winding Ng is a resistor 23, the other end of said resistor being connected to a terminal 25. The other end of winding Ng is connected to the junction point of half-wave rectifiers $\sigma_{c1}$, $\gamma_M$ and $\sigma_{s2}$. Connected to the junction point 20 of rectifier $\gamma_c$ and resistor 21 is the other side of rectifier $\sigma_{c1}$. The other side of rectifier $\sigma_{s2}$ is terminated at terminal 27 whereas the other side of rectifier $\gamma_M$ is connected to one side of resistor 29, the other side of which is grounded. Terminals 31 and 31' are both at ground level. The portion of the circuit comprising core 13, winding Ng and half-wave rectifiers $\sigma_{c1}$, $\sigma_{s2}$ and $\gamma_M$ is designated the "multiplier stage." Meters designated $V_{gc(rms)}$, $V_{1(d-c)}$, $V_{M(d-c)}$ and $V_{2(d-c)}$ for measuring voltages at different points are included in the circuit shown in Fig. 1. (Resistors 15 and 23 are not essential to the operation of the invention but represent the resistance of windings Nc and Ng respectively.)

Figure 2:
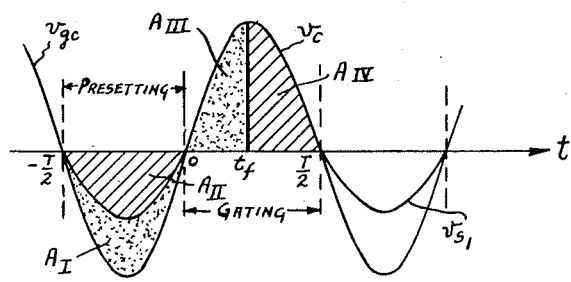
Fig. 2 illustrates graphically the operation of the converter stage included in the invention of Fig. 1.

In operation, a sinusoidal "gate" voltage $v_{gc}$ from a power supply (not shown) is impressed across input terminals 17 and 31 of the converter stage. A half-wave rectified voltage $v_{s1}$ of arbitrary waveform from a signal source (not shown) is applied to terminals 19 and 31 with the polarities as shown in Fig. 1. This signal voltage is converted in the gross output voltage, $v_c$, absorbed by the resistors $(R_{21}+R_{15})$ in the subsequent half cycle after firing. Said gross output voltage, $v_c$, is the sum of the voltages that appear across $R_{15}$ and $R_{21}$. The resulting wave forms of the converter are shown in Fig. 2 where voltage is plotted against time; in essence the converter does not differ from the usual operation of a magnetic amplifier. During a part of the positive ("gating") half-cycle, a voltage $v_{c1}$ is developed across resistor 21, said voltage $$v_{c1} = \frac{v_c R_{21}}{(R_{21}+R_{15})}$$

and being termed the net output voltage of the converter stage. Said net output voltage $v_{c1}$ is the voltage that appears across resistor $R_{21}$. The volt-time area $A_{IV}$ is equal to the volt-time area $A_{II}$ of the signal $v_{s1}$ integrated over the "pre-setting" half-cycle immediately preceding. However, the wave form of $v_{c1}$ is different from the wave form of $v_{s1}$, a "conversion of contour" taking place (see Fig. 2). It can easily be shown that:

$$A_{IV} = (1+\cos \omega t_f)\sqrt{2}\frac{V_{gc}}{\omega} = |A_{II}| = \frac{V_1}{f}$$

where $$v_{gc} = \sqrt{2}\, V_{gc} \sin \omega t$$

$V_1$ = half-wave rectified voltage of signal source $v_{s1}$.

Figure 3:
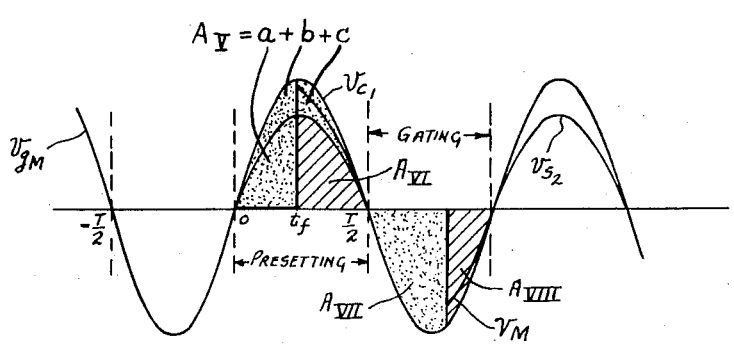
Fig. 3 illustrates graphically the operation of the multiplier stage included in the invention of Fig. 1.

A sinusoidal "gate" voltage $v_{gM}$ is impressed on terminals 25—31' and a half-wave rectified sinusoidal signal $v_{s2}$ is applied to terminals 31'—27 of the multiplier stage. In addition, the "converted" voltage $v_{c1}$ developed across resistor 21 in the converter stage is impressed as an additional signal on terminals 31'—20. Fig. 3 shows in graphical form the resulting wave forms in the multiplier stage where the number of turns in winding Nc are equal to the number of turns in winding Ng, or, $Nc=Ng=N$ and $v_{gc}=v_{gM}$. [In the time interval from 0 to $t_f$, $v_{c1}$ is zero (or nearly so) and therefore the presetting flux change of multiplier core 13 is dictated completely by $v_{gM}$, as the action $v_{s2}$ is obliterated over this interval.] The net voltage acting upon the multiplier core 13 in one pre-setting positive half-cycle of the voltage supply is thus equal to the difference of the gate voltage $v_{gM}$ and of whichever of the two signals $v_{s2}$ and $v_{c1}$ happens to be lower. In said half-cycle the multiplier is re-set from initial saturation by an amount indicated by the volt-time area $A_V$. Therefore, the volt-time area $A_{VIII}$ of multiplier output in the next ("gating") half-cycle is equal and opposite to the area $A_{VI}$ (area under the contour of least ordinates or "common area" of all voltage waves applied) or represented mathematically:

$$|A_{VIII}| = A_{VI} = (1 + \cos \omega t_f) \pi \frac{V_2}{\omega}$$

and, therefore, $$V_M = \frac{R_{29}}{R_{29} + R_{23}} |A_{VIII}| f = \frac{R_{29}}{R_{29} + R_{23}} \frac{\pi}{\sqrt{2}} \frac{V_1 V_2}{V_{gc}}$$

$$V_M = K \frac{V_1 V_2}{V_{gc}}$$

where K is a constant and $V_M$ is the output voltage. Area $A_{VIII}$ is proportional to the product of the amplitude of the signals $v_{s1}$ and $v_{s2}$ and inversely proportional to the amplitude of the gate voltage $v_{gc}$. These relationships are modified by the simple introduction of turn ratio factor if $Nc \neq Ng$. From the foregoing it is seen that the result of multiplication and division is obtained in the final output.

From a careful analysis of the circuitry and circuit theory it can be seen that $V_{gc}$ appears in the denominator of the above-listed equations because increases of $V_{gc}$ will increase $t_f$ and thus reduce the area $A_{VI}$ and $A_{VIII}$. On the other hand, the crest of multiplier gate voltage can be raised without any effect of first order on the results because such variations, while affecting the wave form of multiplier output voltage, do not modify the voltage area $A_{VIII}$ and the reading of meter $V_{M(d-c)}$.

The circuit as described hereinbefore can be modified in a broad variety of ways, for example, many windings can be used on one core to accommodate different levels of signals, impedance matching, etc. Discussion of such modifications and rearrangements of the basic circuit are unnecessary because the basic principles of "contour conversion" and of "common areas" remain unchanged.

An additional multiplier stage similar to the one described and shown in Fig. 1 can be added when the output $V_{M1}$ of the first multiplier is used directly as the signal of the next stage, such next stage also receiving a third signal $v_{s3}$. Further, different gate voltages $V_{gc}$ and $V_{gM1}$ can be applied to the converter stage and to the first multiplier stage. An extension of the invention to any number $n$ of cascaded multiplier stages is self-evident, the final output being equal to $$V_{output} = K \frac{V_1 \cdot V_2 \cdot \ldots V_{(n+1)}}{V_{gc} \cdot V_{gM1} \cdot \ldots V_{gM(n-1)}}$$

Multiwinding core arrangements and different number of turns can be used in any one stage if so desired. Such departures from the simple circuitry illustrated in Fig. 1 modify the output voltage only by a numerical factor that can be easily determined.

Figure 4:
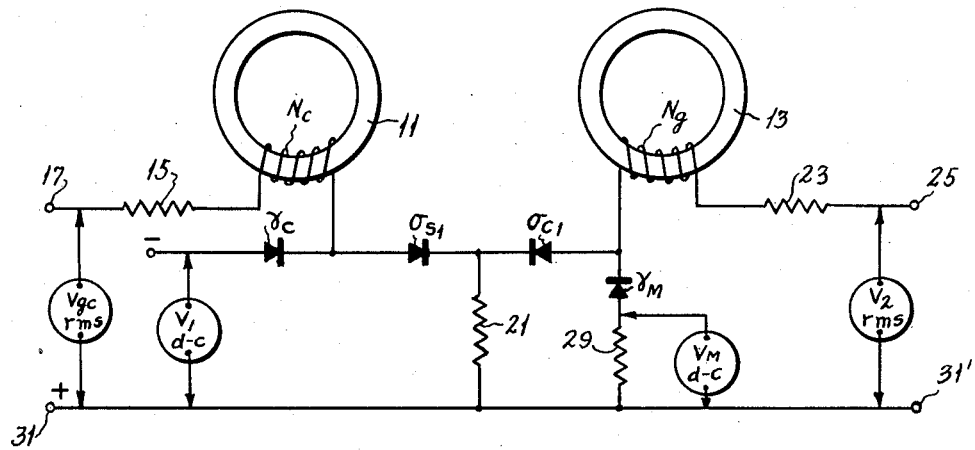
Fig. 4 is a diagram showing a modified embodiment of the invention of Fig. 1.
Figure 5:
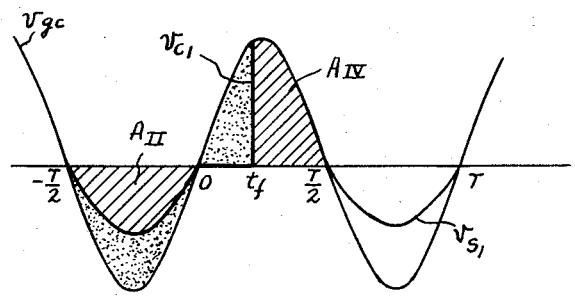
Fig. 5 illustrates graphically the operation of the converter stage included in the invention of Fig. 4.
Figure 6:
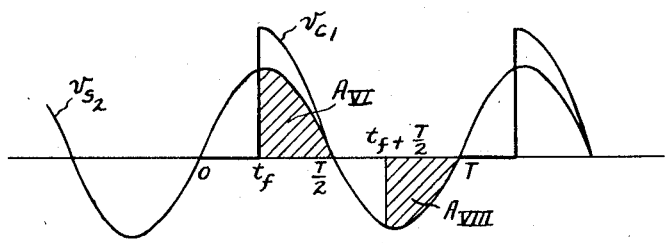
Fig. 6 illustrates graphically the operation of the multiplier stage included in the invention of Fig. 4.

The invention as shown in Fig. 1 can be reduced to a simpler configuration as indicated in Fig. 4 by modifying the multiplier stage. Instead of a double input feeding the multiplier, the stage is reduced to a single-input amplifier, for receiving the converted signal $v_{c1}$. The "gate" voltage of this stage is simply $v_{s2}$ (without rectification). Thus, the output voltage equals the "common area" $A_{VI}$ shown in Fig. 6, or:

$$A_{VI} = (1 + \cos \omega t_f) \sqrt{2} \frac{V_2}{\omega} = |A_{VIII}|$$

and $$V_M = \frac{R_{29}}{R_{29} + R_{23}} |A_{VIII}| f = \frac{R_{29}}{R_{29} + R_{23}} \frac{V_1 V_2}{V_{gc}}$$

It can be seen that in any single-channel amplifier of the type hereinbefore described, the volt-time area output during a gating half-cycle equals the area of least ordinates of signals and gate voltages of the preceding half-cycle. In fact, the pre-setting is performed by the net voltage difference of "gate" voltage and whatever signal is the weaker. Also, if the weaker signal is stronger than $V_{gc}$ the pre-setting process of flux decaying from initial saturation is stopped temporarily because all the rectifiers are blocking the flow of the pre-setting magnetizing current. This principle has been described in the multiplier stages of Figs. 1 and 4 and can be utilized in other applications.

Figure 7:
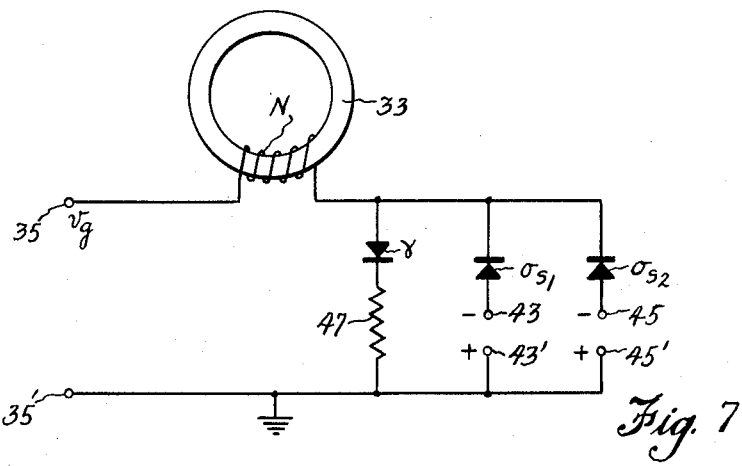
Fig. 7 is a diagram of another embodiment of the invention.

Fig. 7 shows an amplifier having a magnetic core with a winding N thereon. One end of said winding is terminated at terminal 35. Connected in parallel to the other end of said winding are half-wave rectifiers $\gamma$, $\sigma_{s1}$ and $\sigma_{s2}$, the other side of rectifiers $\sigma_{s1}$ and $\sigma_{s2}$ being terminated at terminals 43 and 45 respectively. The other side of rectifier $\gamma$ is connected to one side of resistor 47, the other side of which is grounded. Terminals 35', 43' and 45' are all connected to ground.

Figure 8:
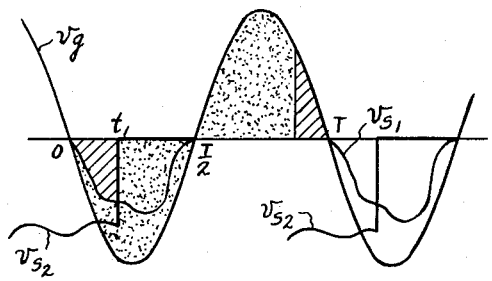
Figs. 8, 9 and 10 illustrate graphically the operation of the invention included in Fig. 7.

Indefinite integration of an analytical function $y(x)$ can be performed by converting the assigned function $y(x)$ into a voltage signal $v_{s1}(t)$ with well known analogue computer techniques over the range of interest. This converted signal is applied periodically to the input terminals 43—43' of the amplifier of Fig. 7, while an auxiliary periodical signal, $t = t_1, t_1 + T, t_1 + 2T, \ldots$ etc., dropping abruptly to zero at times, is impressed on terminals 45—45'. As can be seen from Fig. 8, the gated amplifier output is equal to $$\int_0^{t_1} v_{s1} dt$$

Therefore, if $t_1$ is progressively shifted, a plot of the indefinite integral function can be obtained, for example, from the writing D.-C. meter of adequately large inertia on a roll of paper moving synchronously with whatever organ controls the phase shift of the wave $v_{s2}(t)$.

The periodical obliteration of the action of $v_{s1}(t)$ can also be obtained and phase-shifted in various other ways. For example, by suitably timed mechanical contactors (not shown) temporarily short-circuiting the rectifier $\gamma$ of the single-channel amplifier on terminals 45—45' of a double-channel amplifier, without the need for an additional voltage signal $v_{s2}$.

Figure 9:
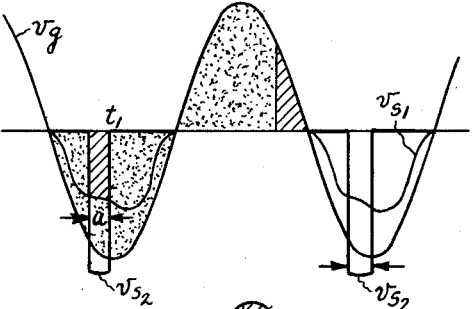

Useful information on the function $y(x)[v_{s1}(t)]$ can also be obtained by use of a scanning wave $v_{s2}$ of a chosen width as shown in Fig. 9 (or by equivalent contactor means (not shown), so as to record outputs equal to $$\int_{t_1}^{t_1} v_{s1} dt$$

Figure 10:
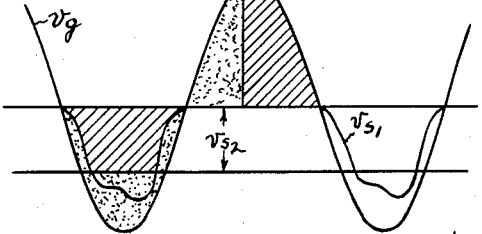

Further, a scanning of $v_{s1}$ by means of a gradually increasing D.-C. voltage $v_{s2}$ yields other information on the function $v_{s1}(t)$ whose outputs are proportional to the areas shaded in Fig. 10. Such circuits, for performing the above-mentioned types of analytical operations are useful in analogue computer systems because of their simplicity.

Obviously many modifications and variations of the present invention are possible in the light of the above teachings. It is therefore to be understood that within the scope of the appended claims the invention may be practiced otherwise than as specifically described.

I claim:
1. An electrical circuit for performing the mathematical operation

$$X = \frac{a_1 \cdot a_2 \cdot a_3 \cdot \ldots a_n}{b_1 \cdot b_2 \cdot b_3 \cdot \ldots b_{(n-1)}}$$

wherein $a_1, a_2, a_3 \ldots a_n$ represent quantities directly proportional to any number of half-wave rectified voltages, and by $b_1, b_2, b_3 \ldots b_{(n-1)}$ represent quantities directly proportional to any number of sinusoidal voltages, comprising a plurality of magnetic amplifier stages, each of said amplifier stages consisting of a magnetic core with a winding thereon, a series circuit including a first half-wave rectifier and a resistor, the rectifier side of such series circuit connected to one end of said winding, connections for a rectified signal source, connections for a source of sinusoidal voltage, a second half-wave rectifier connected to the junction of said series circuit and the end of said winding, said connections for a rectified signal source connected across said second half-wave rectifier and the resistor end of said series circuit, said connections for a source of sinusoidal voltage connected across the other end of said winding and the resistor end of said series circuit; and at least one connecting halfwave rectifier connected between the junction of the resistor and the first half-wave rectifier of said series circuit and the junction of the winding and the series circuit of a succeeding amplifier stage, thereby connecting said amplifier stages in cascade.

2. The invention as defined in claim 1 wherein a voltage is developed across the resistor in said series circuit, said voltage being applied by said connecting half-wave rectifier to each succeeding cascade magnetic amplifier stage, whereby an output voltage is obtained.

3. In combination, a double-input magnetic converter circuit; a single-input-magnetic multiplier circuit; and rectifier means for connecting said circuits, said converter circuit comprising a core having a winding thereon, a first series circuit including a first rectfier and a resistor, the rectifier side of said series circuit connected to one end of said winding, a second rectifier, one side of said second rectifier connected to the junction of said first series circuit and said end of said winding, said multiplier means comprising a core having a winding thereon, a first series circuit including a first rectifier and a resistor, the rectifier side of said series circuit connected to one end of said winding, said connecting rectifier means connected between the junction of the rectifier and resistor of the first series circuit in said converter stage and the junction of the first series circuit and said end of said winding in said multiplier circuit, one of said converter inputs being connected across the other end of the converter core winding and the resistor end of said first series circuit of said converter, the other of said converter inputs being connected across the other end of said second converter rectifier and the resistor end of said first series circuit of said converter, and the input to said multiplier circuit being applied across said first series circuit of said multiplier.

4. In combination, a double-input magnetic converter circuit; a double-input magnetic multiplier circuit; and rectifier means for connecting said circuits; said converter circuit comprising a core having a winding thereon, a first series circuit including a first rectifier and a resistor, the rectifier side of said series circuit connected to one end of said winding, a second rectifier, one side of said second rectifier connected to the junction of said first series circuit and said end of said winding, said multiplier means comprising a core having a winding thereon, a first series circuit including a first rectfier and a resistor, the rectifier side of said series circuit connected to one end of said winding, a second rectifier, one side of said second rectifier connected to the junction of said first series circuit and said end of said winding, said connecting rectifier means connected between the junction of the rectifier and resistor of the first series circuit in said converter stage and the junction of the first series circuit and said end of said winding in said multiplier circuit, one of said converter inputs being connected across the other end of the converter core winding and the resistor end of said first series circuit of said converter, the other of said converter inputs being connected across the other side of said second converter rectifier and the resistor end of said first series circuit of said converter, and said multiplier input being connected across the other side of said second multiplier rectifier and the resistor end of said first series circuit of said multiplier.

5. In combination, a first core having a winding thereon, a first series circuit including a rectifier and a resistor, the rectifier side of said first series circuit connected to one end of such winding, a second rectifier, one side of said second rectifier connected to said rectifier side of said first series circuit, a first sinusoidal voltage applied across the other side of said winding and the resistor end of said first series circuit, a first half-wave rectified voltage impressed across the resistor side of said first series circuit and the other side of said second rectifier, whereby a voltage is developed across said resistor in said first series circuit, a second core having a winding thereon, a second series circuit including a rectifier and a second resistor, the rectifier end of said second series circuit connected to one end of said second winding, a sinusoidal voltage applied across the other end of said second winding and the resistor end of said second series circuit and rectifier means connected between the junction of said rectifier and first resistor of said first series circuit and the junction between said second series circuit and said end of said second winding, whereby an output voltage is developed across said second resistor.

6. In combination, a first core having a winding thereon, a first series circuit including a rectifier and a resistor, said rectifier side of said first series circuit connected to one end of such winding, a second rectifier, one side of said second rectifier connected to said rectifier side of said first series circuit, a first sinusoidal voltage applied across the other side of said winding and the resistor end of said first series circuit, a first half-wave rectified voltage impressed across the other side of said second rectifier and the resistor side of said first series circuit, whereby a voltage is developed across said resistor in said first series circuit, a second core having a winding thereon, a second series circuit including a rectifier and a second resistor, the rectifier end of said second series circuit connected to one end of said second winding, a second rectifier connected to the rectifier end of said second series circuit, a half-wave rectified sinusoidal voltage connected across the other side of said second rectifier and the resistor end of said second series cidcuit, a sinusoidal voltage applied across the other end of said second winding and the resistor end of said second series circuit, and rectifier means connected between the junction of said rectifier and first resistor of said first series circuit and the junction between said second series circuit and said end of said second winding, whereby an output voltage is developed across said second resistor.

References Cited in the file of this patent

A.I.E.E. Transactions, vol. 71, Part I, Communication and Electronics, January 1953, pages 442–446.

Carnegie Inst. of Tech., Dept. of Elec. Eng., Magnetic Amplifiers, Tech. Report No. 12 (Finzi et al.), January 1953.